United States Patent [19]
Thome

[11] 3,850,795
[45] Nov. 26, 1974

[54] MEANS FOR ADJUSTABLE CLAMPING SKIRT BETWEEN PRESSURE VESSEL AND CORE

[75] Inventor: Paul Thome, Saint-Cloud, France

[73] Assignee: Babcock-Atlantique, S.A., Paris, France

[22] Filed: May 1, 1972

[21] Appl. No.: 249,034

[52] U.S. Cl. .................................. 176/50, 176/87
[51] Int. Cl. ......................................... G21c 19/00
[58] Field of Search ............. 176/87, 61, 54, 50, 85

[56] References Cited
UNITED STATES PATENTS

| | | | |
|---|---|---|---|
| 2,990,349 | 6/1961 | Roman | 176/54 |
| 3,100,188 | 8/1963 | Fraas et al. | 176/85 |
| 3,212,978 | 10/1965 | Short et al. | 176/50 |
| 3,682,774 | 8/1972 | Beyer | 176/85 |

Primary Examiner—Reuben Epstein
Attorney, Agent, or Firm—J. M. Maguire

[57] ABSTRACT

Pads are joined to the inside surface of the pressure vessel in a nuclear reactor system, preferably through an electron beam welding process. Screw jacks fitted on the skirt within the pressure vessel engage the pads. The shapes of the pad bearing surfaces allow a longitudinal displacement of the reactor structure in response to thermal conditions. The novel features of the invention, moreover, eliminate skirt vibration and the requirement for high-precision construction.

7 Claims, 6 Drawing Figures

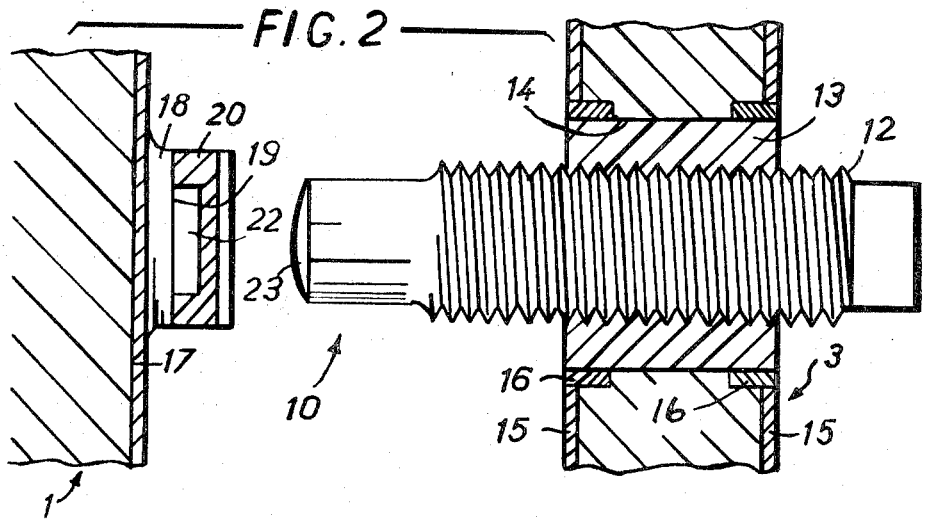
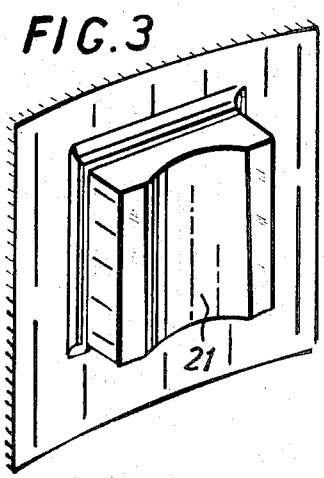
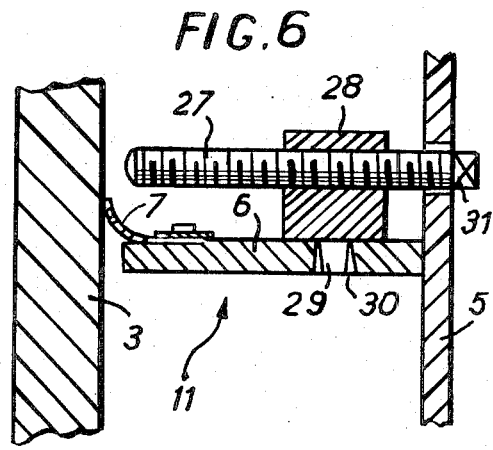
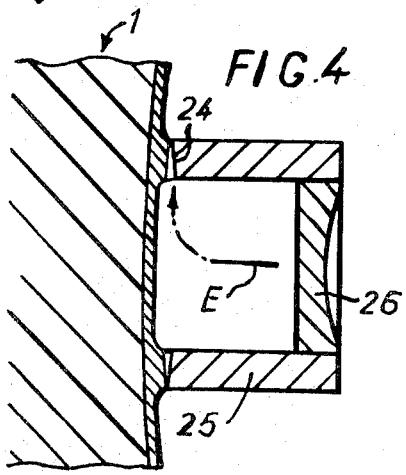
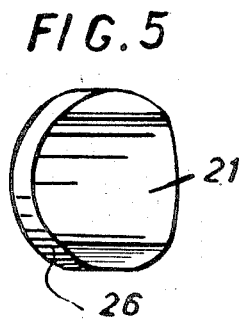

3,850,795

MEANS FOR ADJUSTABLE CLAMPING SKIRT BETWEEN PRESSURE VESSEL AND CORE

BACKGROUND OF THE INVENTION

1. Field of the Invention

The present invention relates to nuclear reactor systems and more particularly, to systems that are characterized by a cylindrical skirt disposed between a cylindrical pressure vessel and a reactor core which is formed of elongated fuel elements that are closely confined in a jacketing, and the like.

2. Prior Art

One of the functions of the skirt within the reactor pressure vessel is to form an annular passageway to promote coolant circulation. In view of the high speed of this fluid, the skirt is in danger of being subjected to severe vibrations. To overcome this problem, the skirt is often of a massive character. In addition, the jacketing for the reactor core generally is built with reference to the skirt. Not only does the jacketing require high precision manufacture, but also because it is associated with the skirt, the skirt requires a comparable degree of precision too. The skirt, in addition to being carefully machined must offer high resistance to deformation, a further reason for increasing the mass of this member.

In summary, the skirt, according to the prior art, is an item of high precision with sufficient mass to resist deformation and withstand vibration. Suspending one edge of the skirt from the interior of the pressure vessel, places the other border of the skirt in contact with another wall of the vessel through precision sliding joints.

An object of the present invention is to facilitate the construction and installation of these skirts, as well as to reduce skirt cost.

SUMMARY OF THE INVENTION

In accordance with the invention, a skirt is adjustably clamped in position through wedging means, e.g. screw jacks, which bear against a rigid element of the installation. The pressure vessel is generally capable of providing this rigid element.

In order to avoid excessive complications in fabrication and installation, the precisely machined sliding joints that have characterized the prior art usually are positioned only at one edge of the skirt. The wedging means typical of the present invention, however, can be positioned at several skirt levels to provide better protection against vibrations, while reducing the mass of the skirt. Furthermore, wedging means, such as screw jacks, are considerably less expensive than the precision sliding contact joints of the prior art.

The invention also is directed to a technique that enables the wedging means to be mounted on protectively plated skirts without degrading the quality of the protection.

Accordingly, the invention provides for a relatively light and flexible reactor skirt that channels the coolant and is protected against vibration through the wedging means which engage either the pressure vessel or a rigid reactor core jacketing.

The objects, characteristics and advantages of the invention will appear in more detail in the illustrative description given below and shown in the attached drawings.

BRIEF DESCRIPTION OF THE DRAWING

FIG. 2 shows in full section and on an enlarged scale, a typical wedging means in accordance with the invention;

FIG. 3 is a perspective view of a portion of the wedging means shown in FIG. 2;

FIG. 4 shows another embodiment of a portion of the wedging means in FIG. 2;

FIG. 5 shows in perspective, an element of the wedging means portion illustrated in FIG. 4; and FIG. 6 shows typical wedging means mounted on a jacketing partition.

DESCRIPTION OF THE PREFERRED EMBODIMENTS

Figure 1:
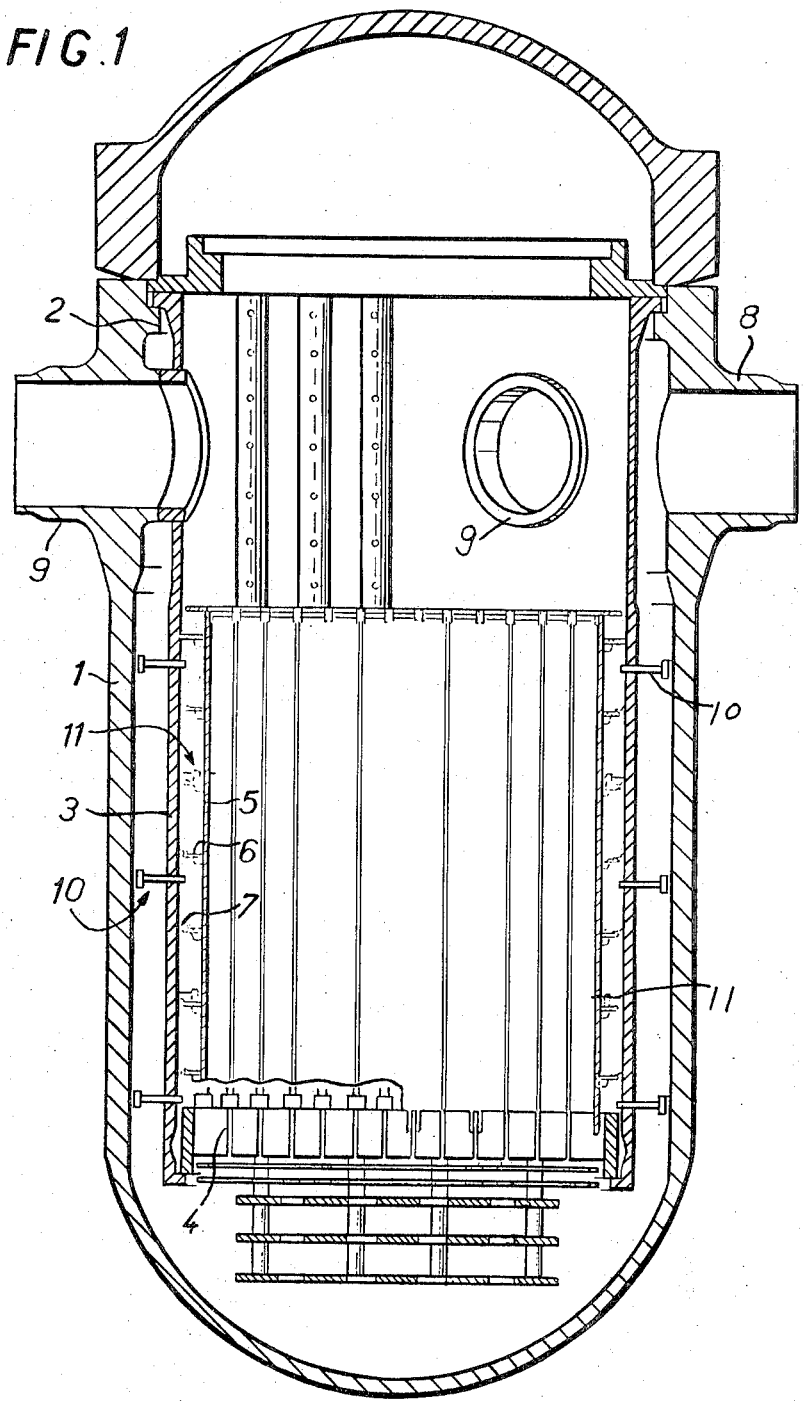
FIG. 1 shows a front elevation in full section of a nuclear reactor equipped with clamping means according to the invention.

In FIG. 1, a typical nuclear installation has a reactor pressure vessel 1, composed of a cylindrical envelope that is closed by means of a hemispherical bottom and top.

At the top of the cell, an annular flange 2, forms a protruding inner face to provide a means for attaching one end of a cylindrically shaped skirt 3 to the interior of the pressure vessel 1. A grid 4 at the opposite end of the skirt 3 rests on a re-entrant flange within the skirt. The grid 4 supports a stack of fuel elements vertically elongated not shown. These elements are held by a lateral jacketing 5 that is stiffened on its outer face through horizontal partitions 6. Most of these partitions 6, moreover, have, on their circular-shaped outer border, a flexible flap 7 which can be seen more clearly in FIG. 6. The flap 7 is disposed in elastic contact with the inner face of the skirt 3.

The cell is equipped at the top with coolant inlet nozzles 8 and outlet nozzles 9, only one of which is shown in FIG. 1. As shown in the drawing the coolant flows into the pressure vessel and in a vertical direction through the annular space formed between the inner surface of the vessel and the skirt 3. The coolant flows to the bottom of the reactor vessel and reverses direction in order to rise through the fuel elements in the core before flowing through the output nozzles 9.

Screw jacks or wedging means 10 protrude through the skirt 3 at three different levels to engage the inner face of the pressure vessel 1 and apply forces in a transverse direction as described subsequently in detail.

Other wedging means or screw jacks 11 are rigidly fixed to the horizontal partitions 6 that are within the skirt 3 and press against the inner face of the skirt. As seen in FIG. 1, the screw jacks 11 apply transverse forces to the skirt 3 at two different levels which are intermediate of the levels at which jacks 10 engage the pressure vessel 1.

In FIG. 2, a typical jack 10 comprises a threaded shaft 12 passing through a threaded sleeve 13 lodged in a hole 14 that is formed in the skirt 3. The skirt 3, moreover, is formed from steel that is protected on both faces by means of plating 15. The hole 14 has, on each of the faces of the skirt, an annular enlargement or recess that receives rings 16. Electron beam welds secure the rings 16 to the threaded sleeve 13 and to the plating 15. Although the base material for the skirt 3 is relatively inexpensive, the sleeve elements 13, the plating 15 and the rings 16 are made of a more costly anti-corrosion material e.g. stainless steel.

The portion of the pressure vessel 1 that is shown in FIG. 2 also is coated with an interior plating 17. A thickening 18 or "buttering" with machined face 19 is provided on the pressure vessel plating 17 in alignment with shaft 12 of the screw jack 10. A support element 20 is secured to the machined face 19 and serves as a seat or thrust saddle for shaft 12 of the screw-jack. As shown, the seat 20 consists essentially of a rectangular plate which presents, on its inner face (i.e., the face that is situated opposite to the end of the shaft 12) a concave groove 21 (FIG. 3) that defines a cylindrical face (FIG. 3) with a longitudinal axis.

On its outer face of the plate 20 a recess 22 or cell is formed. Consequently, the plate 20 is in contact only with the perimeter of the thickening 18. An electron beam weld at the interface between the thickening 18 and the seat 20 joins these elements with one another. Illustratively, the electron beam weld is formed by sweeping the electron beam along the four sides of the plate.

In operation, the shaft 12, which is accessible from the inside of the skirt 3, is turned until rounded end 23 comes in contact with the grooved face 21 (FIG. 3) formed on the supporting seat 20. The jacks 10 protrude from the surface of the skirt 3 at individual points that are angularly spaced from each other, and the threading operations that are carried out on each of the screw jacks 10 tend to restrain the skirt 3 firmly in three distinct and parallel transverse planes. This clamping enables the skirt 3 to overcome the vibrations that characterize the very high speed coolant circulation at the inlet nozzles 8 and the outlet nozzles 9, as well as through the annular space between the skirt 3 and the pressure vessel 1.

The construction of the screw jacks 12 is not limited to a specific precision requirement because they are adjustable in position, and thus they are capable of accommodating a broad range of variations in distance between the inner face of the pressure vessel 1 and the outer face of the skirt 3 that result from construction of the individual components and the assembly of the system.

The threaded sleeves 13 and the associated rings 16 make it possible to mount the jacks 10 on a skirt that is protected with an anti-corrosion plating, and thus do not limit the application of the screw jacks to skirts that are formed entirely from an anti-corrosive metal.

In operation the skirt 3 can expand and contract freely in the longitudinal direction in response to thermal conditions. The rounded heads 23 on jacks 12 in accordance with a feature of the invention are able to slide along the cylindrical surfaces 21 in order to accommodate this longitudinal motion. The form of these grooves, moreover, has the effect of restraining skirt from rotation.

The recess 22 that is formed on the outer face of plate 20, confers on the latter a capacity for elastic deformation to insure that a permanent clamp is established by the jack 12.

FIG. 4 shows, in horizontal section, another form of screw jack supporting seat. In accordance with this embodiment, a crown-shaped buttering or thickening 24 is first formed on the inner face of the pressure vessel. The buttering 24 is machined to form a flat annular surface to which a sleeve 25 is butted.

The sleeve is welded to the thickening 24 through a circular sweep with an electron beam at the interface that is formed between the machined surface of the buttering and the sleeve. An accurate circular sweep is provided with the aid of a device of known type that is adapted to emit an electron beam E in alignment with the axis of the sleeve. The beam is bent into the transverse plane of the interface by means of an electron "deflection" lens in order to complete the weld from the inside of the sleeve 25. Subsequently, a disc 26 is inserted into the sleeve 25 and also is welded in place through another circular sweep with the electron beam in the interface that is formed between the edge of the disc and the inner face of the sleeve 25. The surface of the disc that confronts the rounded end 23 (FIG. 2) of the corresponding jack 12, has a groove 21 which is analogous to that described above in connection with FIGS. 2 and 3. The disc 26 is shown in perspective in FIG. 5.

Turning now to FIG. 6, the jack 11 is adapted to apply a clamping force to the skirt 3 by engaging and pressing against the jacketing 5 of the reactor core.

The jack 11 comprises a screw 27 that is horizontally disposed in a threaded block 28. The block 28 is secured to a horizontal partition 6 on the jacketing 5. The block 28, moreover, bears on its lower face, an eyebolt 29 that is seated in a hole in the partition 6. An electron beam weld 30 at the interface between the eyebolt 29 and the inner surface of the hole joins the block 28 to the partition 6.

A hole 31 in the jacketing 5 in alignment with the screw 27 permits the screw to be manipulated from the inside of the jacketing.

The apparatus described above eliminates, in a particularly effective manner, the risks of internal structural vibration in nuclear reactor installations that are likely to attend the extremely violent hydraulic disturbances that are associated with rapid coolant circulation. The described invention also makes it possible to improve the assembly and installation of the internal reactor structures, and to relieve the many restrictive fabrication tolerances required by the assembly methods that now are in use.

What is claimed is:

1. A nuclear reactor system comprising a generally cylindrical pressure vessel having an inner surface, a reactor core within said pressure vessel, jacketing enclosing said reactor core, a skirt interposed between said jacketing and the inner surface of said pressure vessel, wedging means for adjustably clamping said skirt between said pressure vessel and said jacketing, said wedging means having a plurality of screw jacks protruding through said skirt, said skirt further having a generally cylindrical structure having a plurality of holes formed therein, a plurality of sleeves each individual to a respective one of said screw jacks, said sleeves being received in said holes formed in said skirt, said sleeves having threaded apertures formed in the centers thereof to accommodate said respective screw jacks, said skirt also having a corrosion resistant plating formed on surfaces of said skirt, said skirt holes terminating in annular recesses that are formed in said plating and concentric with said holes, and a plurality of rings each received within a respective recess and welded to individual sleeves and said adjacent plating.

2. A reactor system according to claim 1 further comprising at least one transverse partition secured to said jacket and block means on said partition for supporting other wedging means.

3. A system according to claim 1 wherein said pressure vessel inner surface further comprises a plurality of plates formed thereon, each individual to a respective one of said screw jacks, each of said plates having a cylindrical surface formed thereon to receive said respective screw jack.

4. A system according to claim 3 wherein each of said plates further comprises a centrally disposed cell within each of said plates, said plates being in contact with said pressure vessel inner surface at said respective perimeters.

5. A system according to claim 4 further comprising a plurality of thickenings formed on said pressure vessel inner surface, each of said thickenings being individual to a respective one of said plates, said thickenings having machined surfaces in contact with corresponding surfaces on said plates.

6. A system according to claim 5 wherein said plates further comprise a plurality of sleeve means, each in contact with a respective one of said machined thickening surfaces, ana plurality of grooved discs each received within an end of one of said sleeve means, said grooves accommodating respective screw jacks.

7. A system according to claim 2 wherein said skirt further comprises a generally cylindrical shape having a plurality of holes formed therein, said holes being in alignment with said wedging means for manipulating said wedging means therethrough.

* * * * *